(12) United States Patent
Bergner

(10) Patent No.: US 10,315,822 B2
(45) Date of Patent: Jun. 11, 2019

(54) PACKAGING MATERIAL AND ITEM OF PACKAGING

(71) Applicant: Coveris Rigid (Zell) Deutschland GmbH, Zell/Kaimt (DE)

(72) Inventor: Dieter Bergner, Niedernhall (DE)

(73) Assignee: Coveris Rigid (Zell) Deutschland GmbH, Zell/Kaimt (DE)

( * ) Notice: Subject to any disclaimer, the term of this patent is extended or adjusted under 35 U.S.C. 154(b) by 565 days.

(21) Appl. No.: 14/666,800

(22) Filed: Mar. 24, 2015

(65) Prior Publication Data

US 2015/0266643 A1 Sep. 24, 2015

(30) Foreign Application Priority Data

Mar. 24, 2014 (DE) ........................ 10 2014 103 961

(51) Int. Cl.
| | | |
|---|---|---|
| *B32B 27/08* | (2006.01) | |
| *B32B 27/32* | (2006.01) | |
| *B32B 5/18* | (2006.01) | |
| *C08J 9/00* | (2006.01) | |
| *C08F 110/06* | (2006.01) | |
| *B65D 1/30* | (2006.01) | |
| *B65D 75/28* | (2006.01) | |
| *B65D 75/42* | (2006.01) | |
| *B65D 75/52* | (2006.01) | |
| *B32B 38/00* | (2006.01) | |
| *B65D 65/38* | (2006.01) | |
| *B65D 75/58* | (2006.01) | |

(52) U.S. Cl.
CPC .............. *B65D 75/527* (2013.01); *B32B 5/18* (2013.01); *B32B 27/08* (2013.01); *B32B 27/32* (2013.01); *B32B 38/0012* (2013.01); *B65D 1/30* (2013.01); *B65D 65/38* (2013.01); *B65D 75/28* (2013.01); *B65D 75/42* (2013.01); *B65D 75/58* (2013.01); *C08F 110/06* (2013.01); *C08J 9/00* (2013.01); *B32B 2038/0028* (2013.01); *B32B 2266/025* (2013.01); *B32B 2307/50* (2013.01); *B32B 2307/7163* (2013.01); *B32B 2307/72* (2013.01); *B32B 2439/00* (2013.01); *B32B 2439/40* (2013.01); *B32B 2439/70* (2013.01); *C08J 2323/12* (2013.01); *Y10T 428/15* (2015.01); *Y10T 428/249953* (2015.04); *Y10T 428/31913* (2015.04)

(58) Field of Classification Search
None
See application file for complete search history.

(56) References Cited

U.S. PATENT DOCUMENTS

| | | | | |
|---|---|---|---|---|
| 6,013,363 | A * | 1/2000 | Takahashi | ............... B32B 27/08 156/277 |
| 2003/0183637 | A1* | 10/2003 | Zappa | ................... B26D 3/085 220/359.2 |

\* cited by examiner

*Primary Examiner* — Sheeba Ahmed

(74) *Attorney, Agent, or Firm* — Dinsmore & Shohl LLP

(57) ABSTRACT

Packaging material for producing deep-drawn plastics material packagings, particularly of multipack packagings, wherein the material is constructed to be breakable, and packaging produced therefrom.

17 Claims, 2 Drawing Sheets

PACKAGING MATERIAL AND ITEM OF PACKAGING

CROSS-REFERENCE TO RELATED APPLICATIONS

This Application claims priority for Application 10 2014 103 961.0 filed on Mar. 24, 2014 in Germany, the contents of which is incorporated in its entirety herein.

FIELD OF THE INVENTION

The invention relates to a packaging material for producing deep-drawn plastics material packagings, particularly multipack packagings, as well as to a method for producing a packaging from this material and to a multipack packaging.

BACKGROUND OF THE INVENTION

Packaging materials, which are suitable for producing multipack packagings, of the most diverse kinds are known.

Such packagings are usually made of polystyrol (PS) and, in order that these are separable from one another, have to be provided with punchings and deep scorings.

SUMMARY OF THE INVENTION

The object of the invention is to propose an easily separable material for multipacks.

According to the invention this object is fulfilled in that the material is constructed to be breakable.

The individual packagings of the multipack can thus be easily separated from one another.

In that case it has proved very advantageous if the material at least for the major part is based on polypropylene, bio-polypropylene or plastics materials containing polypropylene or bio-polypropylene.

Consequently, polystyrol, which is costly and difficult to dispose of, can be avoided. By contrast, polypropylene and, in particular, bio-polypropylene can be processed advantageously, easily and in environmentally friendly manner and if necessary can even be composted.

According to the invention it is particularly advantageous if the material is of multi-layer construction, in which at least one layer consists of the breakable material according to the invention.

As a result, the fracture properties can be combined with further properties.

In that case it is very advantageous if the material is of at least triple-layered construction.

The desired properties can be very satisfactorily set by an at least triple-layered construction.

According to the invention is extremely advantageous if fillers, particularly mineral fillers, are added to at least one material layer.

Equally, according to the invention it is very advantageous if at least one material layer is of foamed construction.

On the one hand, material is saved by the foamed material layer. The stability of the composite is influenced and thus the breakability controlled not only by the foamed material layer, but also by the material layer provided with fillers.

In that case it has proved very advantageous if the foamed material layer was physically foamed by nitrogen, carbon, dioxide, water steam or other standard gases.

Very good foaming results are thereby achieved.

Equally, according to the invention it is very advantageous if the foamed material layer was chemically foamed.

As a result, particularly uniform and usually fine-pore foaming results are achieved.

According to the invention it has proved particularly advantageous if the density of the foamed material is between 0.50 and 0.90, particularly between 0.65 and 0.90, $g/cm^3$. Fillers, which can be also used for better capability of foaming, can also be provided in the foamed material layer.

A further embodiment of the invention, which is very advantageous in accordance with the invention, is also present if the foamed material is provided as an inner layer of the packaging material.

According to a further embodiment of the invention it has proved particularly advantageous if at least one outer layer is provided with fillers; preferably a respective layer with fillers is provided on either side of the middle layer.

Particularly good fracture behaviour is achieved with such a sequence of the layers. This means that the construction does not break by itself and unintentionally, but is easily breakable intentionally.

A further very advantageous embodiment of the invention is present when at least one material layer contains a proportion of a regrind of the packaging material, wherein this is preferably provided in the filled material layer or an intermediate layer.

As a result, wastes in the production of the packaging material and also in the production of items of packaging from this packaging material are usable for further production.

Residues occurring particularly at the time of the punching-out of packaging sections can thus be very satisfactorily recycled.

According to the invention it is also extremely advantageous if a cover layer as skin layer is provided on at least one filled layer, wherein each skin layer can have a thickness of 2 to 10%, preferably from 2 to 5%, of the thickness of the overall material.

The filler material of the filled layer is thereby covered. This is important particularly in the case of use of the packaging material for foodstuff packagings in order to prevent direct contact between filler material and content of the packaging. Equally, smooth and thus, for example, very readily printable surfaces can thereby be produced. The skin layer can in that case be an integral constituent of the filled layer or, however, additionally applied thereto.

A further, very advantageous embodiment of the invention also resides in providing the material for breakage by hand at room temperature and thereunder, in which the breakability can be defined by the ratio of fillers to foaming or degree of foaming.

The material is thereby usable very flexibly. Matching of the foamed and filled layers to one another defines the breakability. In that case, fillers can also be provided in the foamed layer.

According to the invention it is also very advantageous if at least one outer layer is punched or scored, in which case the punching or scoring can have depth of 0.03 to 0.1 millimeters.

Breakability is thereby facilitated. In addition, it is predetermined in which regions and in which direction a break shall extend.

A further very advantageous embodiment of the invention also resides in the provision of at least one barrier layer.

Through employment of a barrier layer, use of the material for sensitive contents is also possible. In addition, the shelf-life of the content can be increased.

According to a further embodiment of the invention it is also very advantageous if the material is constructed as a film web or a section.

Through provision of the material as a film web or also as a section, further processing in a very versatile manner is possible.

A very advantageous development of the invention is also present when the material has a thickness between 0.6 and 1.5 millimeters and/or the density of the material is between 0.6 and 1.2 g/cm$^3$, principally between 0.95 and 1.05 g/cm$^3$.

The material is thereby capable of very versatile use particularly for foodstuff packagings. The density of the filled layers can lie in the region of 1.35 g/cm$^3$.

According to the invention it is also extremely advantageous if the packaging is deep-drawn from a web or a sheet of the packaging material under control of the method parameters.

An item of packaging can thereby be formed in simple mode and manner. Through control of the method parameters the properties of the material are prevented from undesired change.

In that case it is very advantageous if a matched profile with undercuts of the deep-drawing punch is provided for the deep-drawing device.

Particularly good deep-drawing results are thereby achieved. Such special deep-drawing punches are known under the catchword 'Innoform'.

A very advantageous item of packaging produced from a packaging material according to the invention is present when a multipack packaging is provided, in which the individual packagings can be broken away from one another.

The material according to the invention can be very satisfactorily used for that purpose. Other packagings are conceivable. For example, it is also conceivable that a piece or the like can be broken away for opening a packaging.

According to the invention it is also very advantageous in this connection if the packaging is provided with a label, a sleeve or printing.

Information, instructions and also advertising or the like can thereby be applied to the packaging in simple mode and manner.

According to the invention it is also extremely advantageous if the packaging is provided for the form-fill-seal standard process.

Thus, items of packaging can be formed which are immediately filled and then directly closed. This is very advantageous particularly from hygienic aspects and also with respect to transport possibilities and stocking prior to filling.

BRIEF DESCRIPTION OF THE DRAWINGS

The invention is explained in more detail in the following by way of a number of embodiments, wherein.

DETAILED DESCRIPTION OF THE PREFERRED EMBODIMENTS

Figure 1:
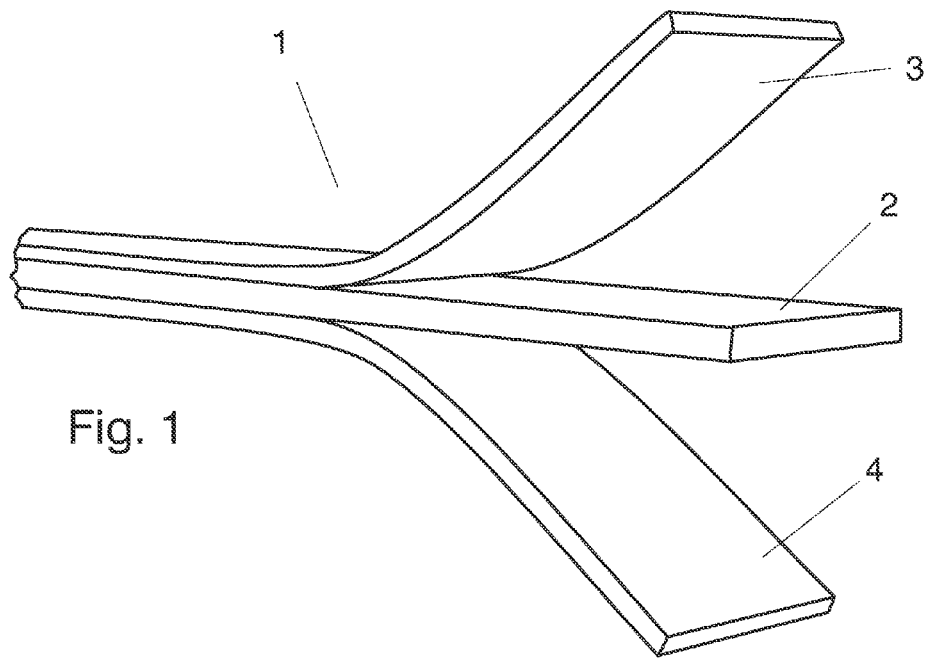
FIG. 1 shows a schematic layer construction of a triple-layered material.
Figure 2:
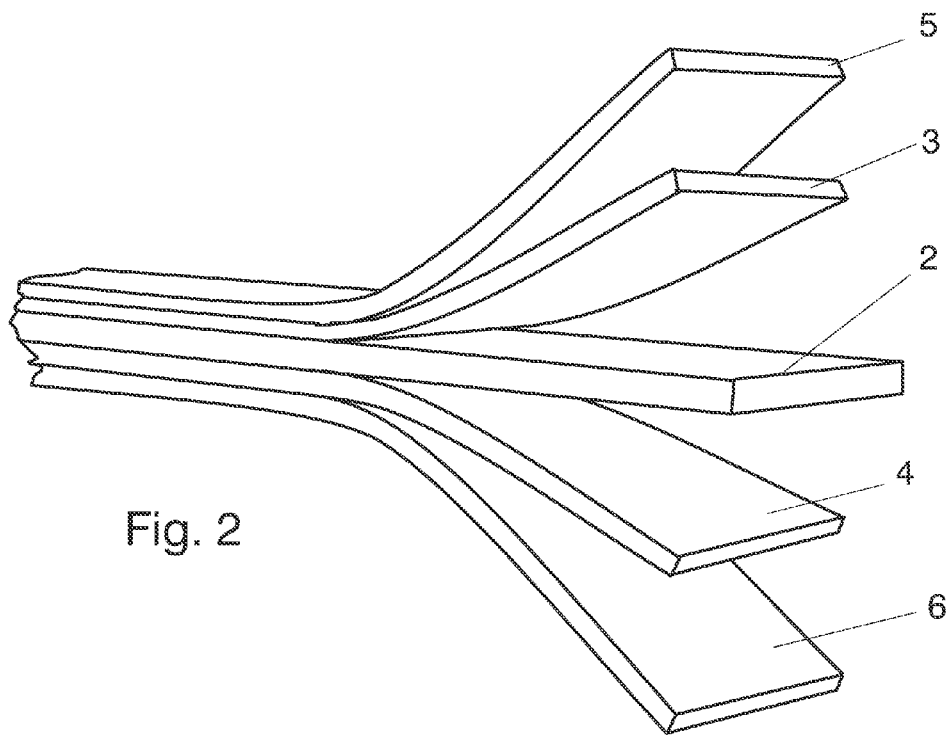
FIG. 2 shows a schematic layer construction of a five-layered material.

A multi-layered material construction with an inner material layer 2 and two outer layers 3 and 4 each arranged on a respective side of the inner material layer 2 is denoted by 1 in FIG. 1.

The inner material layer 2 is made of a foamed polypropylene. It is in that case conceivable to use bio-polypropylene and also blends, copolymers or the like, which, however, usually contain polypropylene or bio-polypropylene at least to a major extent. Also conceivable is the use of other foamable plastics materials.

The density of the foamed material is in that case between 0.50 and 0.90, particularly between 0.65 and 0.90, g/cm$^3$. The foaming can be carried out in a physical or chemical way. In the case of physical foaming, use of nitrogen, carbon dioxide, water steam or other standard gases is possible. Very satisfactory foaming is achieved in environmentally friendly manner by this. The addition of fillers, particularly for improving foaming, is conceivable.

At least one of the two outer layers 3 and 4 is provided with a filler. This filler can contain mineral fillers and also regrinds or the like. Conceivable as mineral fillers are $CaCO_3$, talcum or the like. The density of the filled layers 3 and 4 can in that case be up to 1.35 g/cm$^3$.

In this connection it is conceivable for each of the two outer layers 3 and 4 to be provided with filler.

The foamed layer 2 and the two outer layers 3 and 4 so co-operate that a material breakable at room temperature results, as is known from, for example, multipack packagings of polystyrol, in which individual packagings can be separated by breaking away. The breakability is defined by the interaction of the filled layers 3 and 4 and the foamed layer 2.

According to a further embodiment of the invention it is also conceivable to provide a respective skin layer 5 and 6 on the outer side of the outer layers 3 and 4.

This can be useful particularly on the inner side of the finished packaging so as to prevent undesired effects of the filled layer on the content. It is also conceivable that, by virtue of this skin layer, barrier properties are also added or smooth surfaces produced. The thickness of a skin layer 5 or 6 is usually two to ten percent, preferably two to five percent of the total thickness of the material.

Surfaces which are especially smooth can be very satisfactorily printed, so that a uniform and high-quality printed image can be applied.

In order to facilitate breaking and/or control the fracture the surface of the material 1 can be lightly punched or scored.

In that case, the punching or scoring can have a maximum depth of between 0.03 and 0.1 millimeters.

Forming of such small punching or scoring depths has proved sufficient. The fracture is nevertheless significantly facilitated and reliably controlled.

Figure 3:
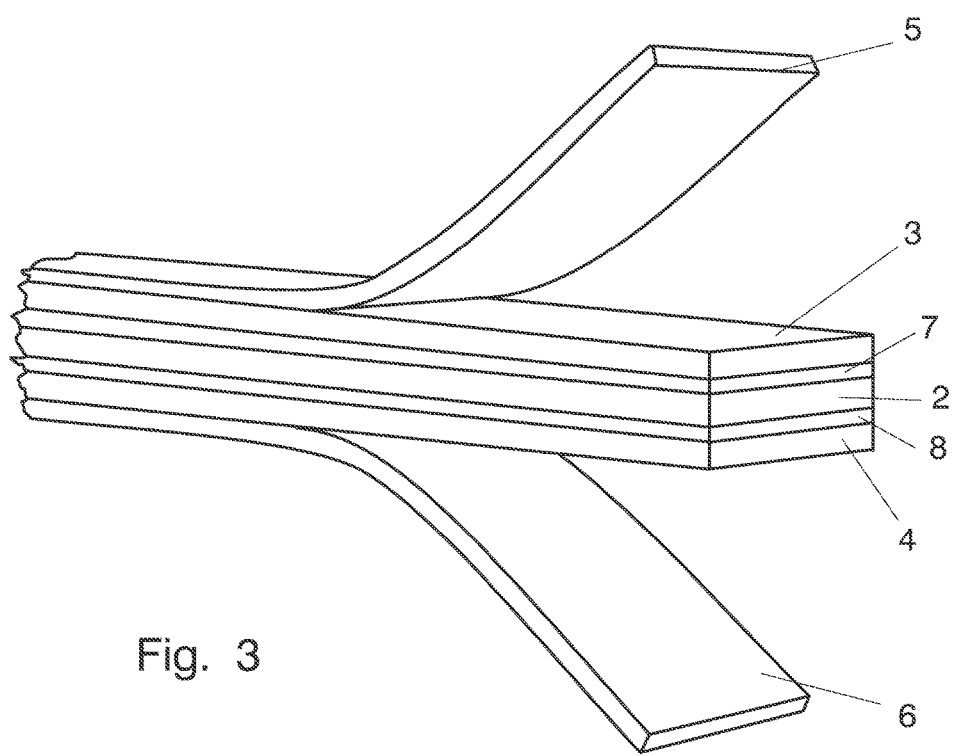
FIG. 3 shows a schematic layer construction of a seven-layered material.

According to a further embodiment of the invention, which is illustrated in FIG. 3, it is possible to provide, for example between the inner layer 2 and the two outer layers 3 and 4, tie, barrier or other functional layers, here denoted by the numerals 7 and 8.

The entire material usually has a thickness of between 0.6 and 1.5 millimeters.

The density is between 0.6 and 1.2 g/cm$^3$, preferably between 0.95 and 1.05 g/cm$^3$.

The material can, for further processing, be provided as a film web or as a web section, i.e. as a sheet.

In order to form an item of packaging from the material, the material is deep-drawn.

In that case, the deep-drawing parameters have to be controlled and maintained within usual limits.

The use of a deep-drawing device with a matched profile with undercuts of the deep-drawing punch, this also being known by the catchword 'Innoform', is particularly advantageous, since the material thickness in the deep-drawing packaging is thereby kept substantially constant.

The thus-produced packagings, particularly multipack packagings, can be provided on the outer side with printings, labels and also sleeves.

The individual packagings of the multipack can be separated as required by simple breaking off from the multipack.

The packaging material according to the invention is particularly suitable in all its variants for the form-fill-seal process.

Due to low storage cost and only small problems with hygiene this process is often used for foodstuff products, particularly yoghurt and the like.

Multipacks are also common there, these then being separated by the end user as required.

Other possibilities of use are conceivable.

It is additionally conceivable that the packaging material according to the invention can also be varied. Further additional layers are conceivable. Equally, it is conceivable that only one tie layer or intermediate layer 7 and 8 is provided. Equally, it is conceivable that only one skin layer 5 and 6 is provided.

The foamed layer 2 and a layer 3 or 4 provided with fillers can be regarded as a minimum requirement of the packaging material according to the invention.

The invention claimed is:

1. A packaging material for producing deep-drawn plastics material packagings, characterised in that:
    the packaging material is based on polypropylene, bio-polypropylene or plastics materials containing polypropylene or bio-polypropylene;
    the packaging material is of multi-layered construction;
    fillers are added to at least one material layer of the packaging material;
    at least one material layer of the packaging material is of foamed construction; and
    the packaging material is constructed to be breakable due to the interaction of the fillers in the at least one material layer and the at least one material layer of foamed construction.

2. The packaging material according to claim 1, characterised in that the packaging material is of at least triple-layered construction.

3. The packaging material according to claim 1, characterised in that the foamed material layer was physically foamed by nitrogen, carbon dioxide, water steam or other standard gases.

4. The packaging material according to claim 1, characterised in that the foamed material layer was chemically foamed.

5. The packaging material according to claim 1, characterised in that the density of the foamed material is between 0.50 and 0.90 g/cm$^3$.

6. The packaging material according to claim 1, characterised in that the foamed layer is provided as an inner layer of the packaging material.

7. The packaging material according to claim 1, characterised in that at least one layer on either side of the middle layer is provided with fillers.

8. The packaging material according to claim 1, characterised in that at least one material layer contains a component of a regrind of the packaging material, wherein this is provided in the filled material layer.

9. The packaging material according to claim 1, characterised in that a cover layer is provided as a skin layer on at least one filled layer, wherein each skin layer can have a thickness of 2 to 10% of the thickness of the overall material.

10. The packaging material according to claim 1, characterised in that the material is provided for breaking by hand at room temperature and thereunder, wherein the breakability is defined by the ratio of fillers to the foaming or degree of foaming.

11. The packaging material according to claim 1, characterised in that at least one outer layer is punched or scored, wherein the punching or scoring has a depth of 0.03 to 0.1 millimeters.

12. The packaging material according to claim 1, characterised in that at least one barrier layer is provided.

13. The packaging material according to claim 1, characterised in that the material is constructed as a film web for a section.

14. The packaging material according to claim 1, characterised in that the material has a thickness of between 0.6 and 1.5 millimeters and/or the density of the material is between 0.6 and 1.2 g/cm$^3$, principally between 0.95 and 1.05 g/cm$^3$.

15. A packaging material for producing deep-drawn plastics material packagings, characterised in that:
    the packaging material is based on polypropylene, bio-polypropylene or plastics materials containing polypropylene or bio-polypropylene;
    the packaging material is of multi-layered construction;
    fillers are added to at least one material layer of the packaging material;
    at least one material layer of the packaging material is a foamed material layer of a foamed construction having a density between 0.50 and 0.90 g/cm$^3$; and
    the packaging material is constructed to be breakable due to an interaction of the at least one material layer in which the fillers are added and the foamed material layer of foamed construction.

16. The packaging material according to claim 15, characterised in that the foamed material layer was physically foamed by nitrogen, carbon dioxide, water steam or other standard gases.

17. The packaging material according to claim 15, characterised in that the foamed material layer was chemically foamed.

* * * * *